STEPHEN USTICK.
LUBRICATING LOOSE PULLEYS

No. 119,287. Patented Sep. 26, 1871.

INVENTOR
Stephen Ustick

WITNESSES
Thomas J. Bewley
H. Ashton Henry

UNITED STATES PATENT OFFICE.

STEPHEN USTICK, OF PHILADELPHIA, PENNSYLVANIA.

IMPROVEMENT IN LUBRICATING LOOSE PULLEYS.

Specification forming part of Letters Patent No. 119,287, dated September 26, 1871; antedated September 15, 1871.

*To all whom it may concern:*

Be it known that I, STEPHEN USTICK, of the city of Philadelphia and State of Pennsylvania, have invented certain Improvements in Lubricating Loose Pulleys, of which the following is a specification:

The nature of my invention consists in the construction of the part of the shaft on which the loose pulley is situated with a longitudinal groove or channel, in combination with an annular groove in a bearing of a shaft at the side of the pulley, the said annular groove having communication with an oil-reservoir, and the end of the longitudinal groove covered by the pulley a communication with the eye of the latter. The said longitudinal and annular grooves are provided with fibrous packing through which the oil is caused to flow, as hereinafter described.

The end of the longitudinal groove which communicates with the eye of the pulley also connects with an annular groove in the periphery of the shaft, which groove is also provided with fibrous material that receives a continuous supply of oil from the longitudinal groove, and distributes it upon the eye of the pulley when the latter revolves on the shaft. I enlarge the longitudinal and annular grooves at the bottom to cause the packing to expand at that point, and thereby remain securely in position.

To enable others skilled in the art to which my invention appertains to apply the same to practice, I will now give a full description thereof.

Figure 1:
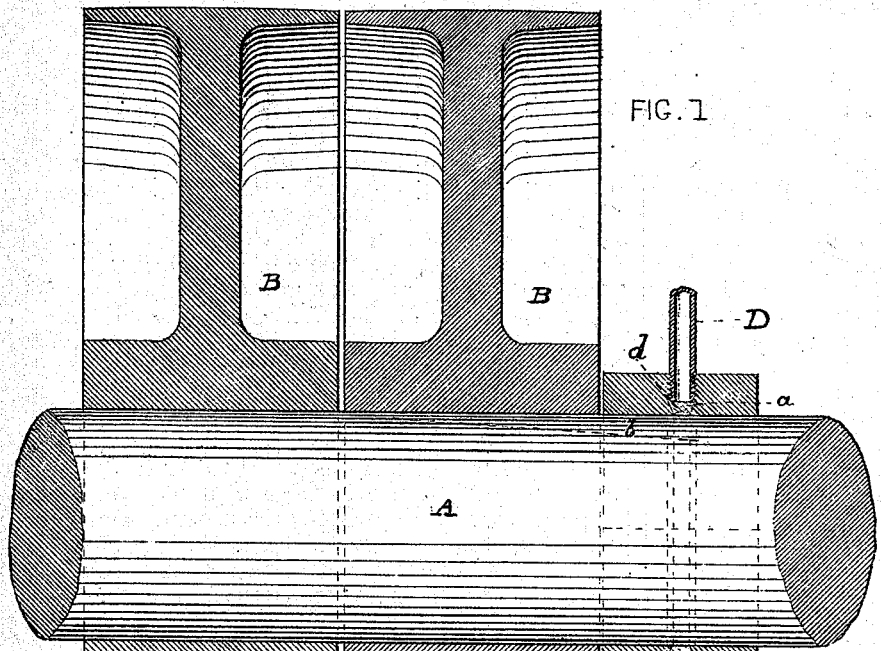
Figure 2:
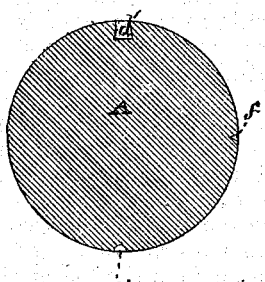
Figure 3:
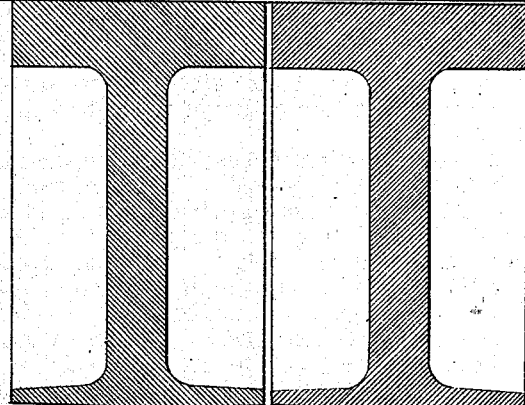

In the accompanying drawing, which makes a part of this specification, Figure 1 is a vertical section of a loose pulley, B, and tight pulley B', in connection with a portion of a shaft, C, a side view of which is shown in same figure. Fig. 2 is a cross-section of the shaft A at the line $x\ x$ of Fig. 1. Fig. 3 is a side view of a portion of the shaft A, having an annular packing-groove, $d''$.

Like letters in all the figures indicate the same parts.

A is a portion of a shaft on which is situated a loose pulley, B, and a tight pulley, B'. C is a bearing for the shaft A. It is used as a means for making a connection with an oil-reservoir and the eye of the pulley, there being an annular groove, $a$, in the bearing which communicates, by means of the tube D, with the reservoir, not shown in the drawing, and a longitudinal groove, $b$, in the side of the shaft, one end of which connects with the said annular groove at one end, and with the eye of the pulley at the other end. The annular groove $a$ and longitudinal groove $b$ are filled with fibrous material $d\ d'$, through which the oil is caused to pass to the eye of the pulley by capillary attraction.

To give more completeness to the lubrication I form an annular groove, $e$, in the shaft, as seen in Fig. 3, which is filled with fibrous material $d''$. The said grooves $a\ b\ e$ I enlarge at the bottom, for the purpose of keeping the packing securely in position.

The centrifugal force of the shaft is made to facilitate the flow of oil by making the groove $d'$, at its receiving end, deeper than at its exit end, or the end communicating with the eye of the pulley, the bottom of the groove being thereby further from the center of the shaft at this point. By this means the packing $d''$, in the annular groove $e$, becomes well saturated with oil when the shaft is in motion, so that when the shaft is at rest and the pulley revolves thereon the accumulated oil in the said annular packing, and the amount which flows by means of capillary attraction through the groove $d'$, are sufficient for a perfect lubrication of the eye of the pulley.

Under some circumstances the groove $e$ and packing $d''$ may be dispensed with, and the packing $d'$ in the longitudinal groove $a$ may also be omitted. In the latter case the groove may be made small, as at $f f'$, in Fig. 2. A number of the small grooves should be made if one does not convey a sufficient amount of oil.

By continuing the longitudinal grooves $b$ each way throughout the whole length of the shaft to its journals in the same or similar manner that it is connected with the eye of the pulley, and covering the same between the journals by a sleeve, or in any other convenient manner, to keep the oil intact in the groove, the journals may also be lubricated. The reservoir may be placed below the shaft A, and the oil conveyed to the bearing C by means of capillary attraction, by filling the tube D with fibrous material.

When desired the oil-reservoir may be constructed in the body of the bearings C by enlarging the size of the latter.

What I claim as my invention, and desire to secure by Letters Patent, is—

1. The combination of the longitudinal groove $b$ in the periphery of the shaft A, with the eye of the loose pulley B and the annular groove $a$ of the bearing C, the said grooves being arranged and operating in relation to the eye of said pulley and the supply-tube D, substantially in the manner and for the purpose above described.

2. The annular groove $e$ on the shaft A, and packing $d''$, in combination with the groove $b$, substantially as and for the purpose set forth.

In testimony that the above is my invention I have hereunto set my hand and affixed my seal this 19th day of November, 1870.

STEPHEN USTICK. [L. S.]

Witnesses:
SAM. W. GARTLEY,
THOMAS J. BEWLEY.

(20)